US008569427B2

(12) United States Patent
Tang

(10) Patent No.: US 8,569,427 B2
(45) Date of Patent: Oct. 29, 2013

(54) POLYMERS DERIVED FROM ROSIN AND THEIR METHODS OF PREPARATION

(75) Inventor: Chuanbing Tang, Columbia, SC (US)

(73) Assignee: University of South Carolina, Columbia, SC (US)

( * ) Notice: Subject to any disclaimer, the term of this patent is extended or adjusted under 35 U.S.C. 154(b) by 131 days.

(21) Appl. No.: 12/900,557

(22) Filed: Oct. 8, 2010

(65) Prior Publication Data

US 2011/0086979 A1 Apr. 14, 2011

Related U.S. Application Data

(60) Provisional application No. 61/278,553, filed on Oct. 8, 2009, provisional application No. 61/396,102, filed on May 21, 2010.

(51) Int. Cl.
*C08F 283/00* (2006.01)

(52) U.S. Cl.
USPC ............. 525/418; 525/450; 525/451; 526/90; 526/146; 526/147; 526/218.1; 526/219.2; 526/219.3; 526/219.6; 526/222; 526/237; 526/280; 526/284

(58) Field of Classification Search
USPC ............ 525/418, 450, 451; 526/90, 146, 147, 526/218.1, 219.2, 219.3, 219.6, 222, 237, 526/280, 284
See application file for complete search history.

(56) References Cited

U.S. PATENT DOCUMENTS

| | | | | | |
|---|---|---|---|---|---|
| 2,614,997 | A | * | 10/1952 | Robinson, Jr. et al. | ....... 526/227 |
| 2,973,332 | A | * | 2/1961 | Fikentscher et al. | .............. 525/8 |
| 3,023,179 | A | * | 2/1962 | Fischer et al. | ................. 524/271 |
| 2012/0214950 | A1 | * | 8/2012 | Tang et al. | .................... 525/418 |

OTHER PUBLICATIONS

Ragauskas et al., "The Path Forward for Biofuels and Biomaterials", Science 311, 484, (2006), pp. 484-489.
Williams et al,, "Polymers from Renewable Resources: A Perspective for a Special Issue of Polymer Reviews", Polym. Rev. 48, (2008) pp. 1-10.
Maiti et al.,"Rosin: A Renewable Resource for Polymers and Polymer Chemicals", Prog. Polym. Sci. 14, (1989), pp. 297-338.
Ray at al., "Polymers from Renewable Resources, Part 7, Synthesis and Properties of Polyamideimide from Rosin-Maleic Anhydride Adduct", Angew. Makro. Chem. 122, (1984), pp. 153-167.
Wang at al., "Study on the Synthesis, Characterization and Kinetic of Bulk Polymerization of Disproportionated Rosin (Acryloxyl Ethyl) Ester", J. Appl. Polym. Sci. 113, (2009), pp. 3757-3765.

Moad et al., "Living Radical Polymerization by the Raft Process", Aust. J. Chem. 58, (2005), pp. 379-410.
Matyjaszewski et al., "Atom Transfer Radical Polymerization", Chem. Rev. 101, (2001), pp. 2921-2990.
Hawker et al., "New Polymer Synthesis by Nitraxide Mediated Living Radical Polymerizations", Chem. Rev. 101, (2001), pp. 3661-3688.
Webster et al., "Group Transfer Polymerization: Mechanism and Comparison with Other Methods for Controlled Polymerization of Acrylic Monomers", Prog. Polym. Sci. 167, pp. 1-34. (2004).
Zheng et al., "Well-Defined Renewable Polymers Derived from Gum Rosin", Macromolecules 43, (2010), pp. 5922-5924.
Corma et al., "Chemical Routes for the Transformation of Biomass into Chemicals", Chem. Rev. 107, (2007), pp. 2411-2502.
Dodds et al, "Chemicals from Biomass", Science 318, (2007), pp. 1250-1251.
Hollinger, J.O., "Biomedical Applications of Synthetic Degradable Polymers", CRC Press: Boca Raton, FL, 1995.
Mecking, Stefan, "Nature or Petrochemistry", Angew. Chem. Int. Ed. 43, (2004), pp. 1078-1085.
Hillmyer, Marc A., "Nanoporous Materials from Block Copolymer Precursors", Adv. Polym. Sci. 190, (2005), pp. 137-181.
Wool et al, "Affordable Composites and Plastics from Renewable Resources: Part 1: Synthesis of Monomers and Polymers", *Advancing Sustainability Through Green Chemistry and Engineering*, Lankey, R.L., Ed; American Chemical Society, Washington, D.C. vol. 823, (2002), pp. 177-204.
Maiti, et al. "Renewable Resources from Forest Products", *Polymer Application of Renewable-Resource Materials*, Carraher, C.E.; Sperling, L.H., Eds.; Plenum Press, New York, (1983), pp. 129-137.
Do et al., "Synthesis and Characteristics of Photoactive-Hydrogenated Rosin Epoxy Methacrylate for Pressure Sensitive Adhesives", J. Appl. Polym. Sci. 111, (2009), pp. 1172-1176.
Zhang et al., "Morphology, Mechanical Properties, and Thermal Stability of Polyurethane-Epoxide Resin Interpenetrating Polymer Network Rigid Foams", J. Appl. Polym. Sci. 75, (2000), pp. 406-416.
Bicu et al., "Polymers from a Levopimaric Acid-Acrylonitrile Diels-Alder Adduct: Synthesis and Characterization", J. Polym.Sci., Polym. Chem. 53, (2005), pp. 6308-6322.
Riva et al., "Combination of ring-opening polymerization and "click" chemistry towards functionalization of aliphatic polyesters", Chem. Commun., (2005), pp. 5334-5336.
Jiang et al., ""Clickable" Polyglycolides: Tunable Synthons for Thermoresponsive, Degradable Polymers", Macromolecules 41, (2008), pp. 1937-1944.

\* cited by examiner

*Primary Examiner* — Peter D Mulcahy
(74) *Attorney, Agent, or Firm* — Dority & Manning, P.A.

(57) ABSTRACT

Methods of forming polymer material from rosin-derived material are provided. For example, a plurality of functionalized resin acids having a polymerizable functional group via controlled living polymerization can be polymerized into the polymeric material such that each polymer defines a functional end group and the polymeric material has a polydispersity index of about 1 to about 1.5. The resulting polymers are also described.

34 Claims, 5 Drawing Sheets

POLYMERS DERIVED FROM ROSIN AND THEIR METHODS OF PREPARATION

The present application claims priority to U.S. Provisional Patent Application No. 61/278,553 titled "Preparation and Applications of Well-Defined Polymers Derived from Rosin" filed on Oct. 8, 2009 by Tang, et al. and U.S. Provisional Patent Application No. 61/396,102 titled "Gum Rosin Containing Degradable Polymers" filed on May 21, 2010 by Tang, et al., the disclosures of which are incorporated by reference herein.

BACKGROUND

Synthetic plastics account for the use of 7% of fossil fuels in the world. The limited resources and rising price of fossil fuels present a challenge to seek developing renewable resources for manufacturing of "green" plastics. However, applications of renewable polymers lag significantly behind petrochemical-derived polymers, partially because of limitations in the monomer resources and the derived polymers with controlled properties.

Rosin (including gum rosin, wood rosin and tall rosin) is an exudate from pine trees and other plants. The major components of rosin are resin acids: primarily abietic acid (AA) and levopimaric acid. The presence of a carboxyl group and/or conjugated double bonds in their structures imparts them tunable chemical reactivity: e.g. derivation of a vinyl group. Rosin and its derivatives, produced millions of tons annually, are generally used as ingredients for inks, vanishes, adhesives, paper size, cosmetics, medicines, chewing gums, etc. Some of them are used as additives or modifying agents for the improvement of the properties of synthetic polymers. However, the use of rosin as renewable resources for the preparation of well-defined synthetic polymers (e.g. homopolymers and block copolymers) has not yet been explored. The major reason behind this is that most rosin based polymers are prepared by step growth polymerization or free radical polymerization that lack controls on the polymer structures at molecular level, molecular weight, molecular weight distribution and functionality. The absence of the tunability of these parameters limits these polymers used for broader and promising alternatives to petroleum based polymers such as thermoplastic resins, thermoplastic elastomers, polymeric varnishes, polymeric wax, adhesives, coatings, printing inks to shape memory polymers, polymer nanocomposites, pharmaceutics, anti-fouling materials, etc.

As such, a need exists for well-defined rosin-derived polymers with controllable molecular weight, low polydispersity and varied chemical topologies and chain functionality.

SUMMARY

Objects and advantages of the invention will be set forth in part in the following description, or may be obvious from the description, or may be learned through practice of the invention.

In general, the present disclosure is directed toward methods of forming polymer material from rosin-derived material. For example, a plurality of functionalized resin acids having a polymerizable functional group can be polymerized via controlled and/or living polymerization. As such, the polymeric material can have well-controlled functional end groups and can have a polydispersity index of about 1.0 to about 1.5. The resulting polymers are also described.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which.

Figure 1:
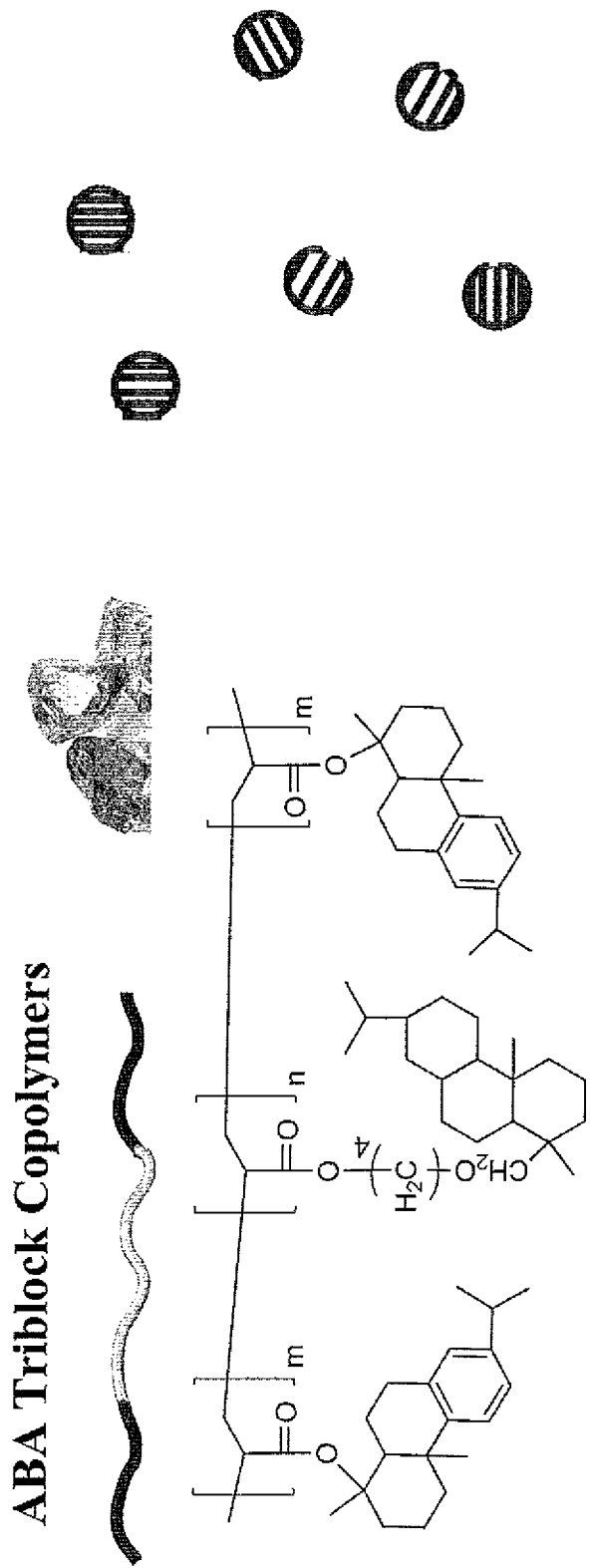
FIG. 1 shows an example of well-defined rosin-derived polymers defining an ABA triblock copolymers for thermoplastic elastomers.

Repeat use of reference characters in the present specification and drawings is intended to represent the same or analogous features or elements of the present invention.

DEFINITIONS

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and atatic symmetries.

The term "organic" is used herein to pertaining to a class of chemical compounds that are comprised of carbon atoms. For example, an "organic polymer" is a polymer that includes carbon atoms in the polymer backbone.

The "number average molecular weight" ($M_n$) is readily calculated by one of ordinary skill in the art, and generally refers to the ordinary arithmetic mean or average of the molecular weights of the individual macromolecules. It is determined by measuring the molecular weight of n polymer molecules, summing the weights, and dividing by n, such as represented in the formula:

$$\overline{M}_n = \frac{\sum_i N_i M_i}{\sum_i N_i}$$

where $N_i$ is the number of molecules of molecular weight $M_i$. The number average molecular weight of a polymer can be determined by gel permeation chromatography and all colligative methods, like vapor pressure osmometry or end-group determination.

The "weight average molecular weight" ($M_w$) is readily calculated by one of ordinary skill in the art, and generally refers to:

$$\overline{M}_w = \frac{\sum_i N_i M_i^2}{\sum_i N_i M_i}$$

where $N_i$ is the number of molecules of molecular weight $M_i$. The weight average molecular weight can be determined by gel permeation chromatography, light scattering, small angle neutron scattering (SANS) and X-ray scattering.

The polydispersity index (PDI) is a measure of the distribution of molecular mass in a given polymer sample. The PDI calculated is the weight average molecular weight divided by the number average molecular weight (i.e., $PDI=M_w/M_n$). It indicates the distribution of individual molecular masses in a batch of polymers. The PDI has a value equal to or greater than 1, but as the polymer chains approach uniform chain length, the PDI approaches unity (i.e., 1).

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention covers such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Generally speaking, the present disclosure is directed to well-defined rosin-derived polymers and their methods of production. Thus, a synergistic strategy has been developed to form well-defined polymers from a renewable resource—rosin, which is an exudate from pine trees and other plants. Accordingly, well-defined rosin-derived polymers with controlled molecular weight, low polydispersity, chemical topologies and end group functionality can be developed to provide tailored properties for applications in the areas of thermoplastic resins, thermoplastic elastomers, adhesives, printing inks, paper-sizing, varnishes, coatings, nanocomposites, shape memory materials, anti-fouling materials, nanoporous membranes, etc.

The presently disclosed methods can allow for controllable molecular weight, low polydispersity and varied chemical topologies and chain functionality of the polymers. Thus, a broad strategy is generally disclosed allowing for the development of well-defined polymers derived from renewable resources, which can provide access to diverse polymers that rosin offers, but with controlled structures and molecular weight. Successful implementation of these rosin-based polymers can lead to replacement of petrochemical-based polymers, thus reducing consumption of major synthetic polymers from fossil fuels.

More particularly, methods are provided for preparing well-defined polymers from rosin based materials (e.g., rosin based monomers, such as modified resin acids). The well-defined polymers can include block copolymers, random copolymers, graft copolymers, star copolymer, or organic/inorganic hybrids that contain at least one polymerized monomer derived from rosin. Such well-defined polymers have controllable compositions, controllable molecular weight, a narrow molecular weight distribution, and end group functionality.

Rosin-derived polymers developed according to the present disclosure can have applications ranging from thermoplastic resins, thermoplastic elastomers, varnishes, wax, paper sizing, adhesives, coatings, printing inks to shape memory polymers, nanocomposites, pharmaceutics, anti-fouling, nanoporous membrane, etc.

Generally, the polymers can be formed by direct polymerization of rosin-derived monomers or by attaching rosin based materials to existing polymer substrates. For example, rosin based materials (e.g., resin acids) can be functionalized to form rosin-derived monomers and then polymerized, as discussed in greater detail below.

I. Rosin-Derived Monomers

Rosin's major components include resin acids, which can be obtained from pine trees and other plants, in a number of isomeric forms. Generally, the resin acids have a three ring structure (e.g., a hydrophenanthrene-based three ring structure) with a carboxylic acid functional group (i.e., —COOH). Prevalent resin acids include, but are not limited to, abietic acid, neoabietic acid, dehydroabietic acid, palustric acid, levopimaric acid, pimaric acid, isopimaric acids, etc. Nearly all resin acids have the same basic skeleton of a 3-ring fused system with the empirical formula $C_{19}H_{29}COOH$.

Six particularly suitable resin acids for use as monomers in the presently disclosed methods and polymers include levopimaric acid, abietic acid, dehydroabietic acid, hydroabietic acid, pimaric acid, isopimaric acid, and mixtures thereof due to their availability commercially at various purities. The chemical structures of each of these resin acids are provided below and are generally known in the art:

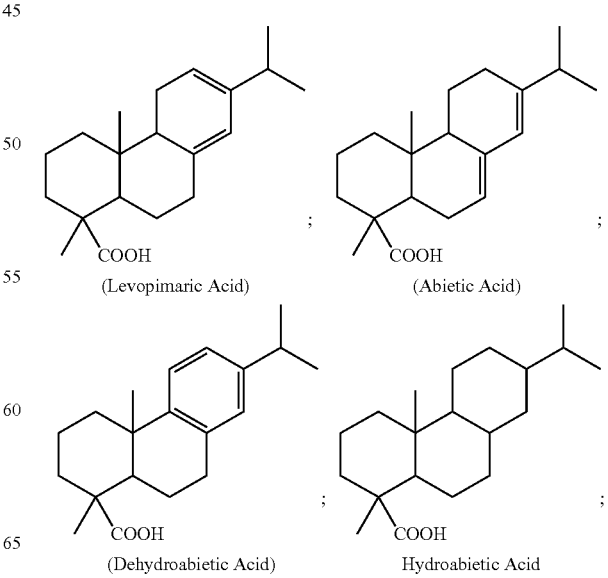

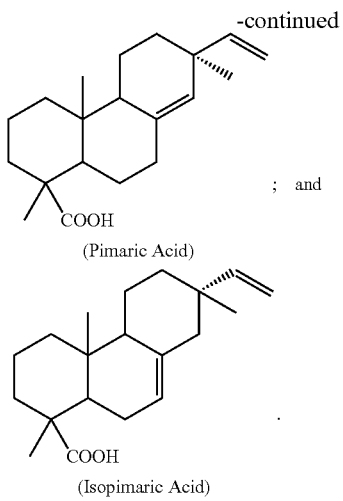

(Pimaric Acid)

; and (Isopimaric Acid)

As shown, each of these resin acids have a carboxylic acid group (i.e., R—COOH) attached to the hydrophenathrene-based rings.

The resin acid or mixture of resin acids (collectively referred to as "resin acid(s)") can be purified through standard techniques to provide a substantially pure resin acid(s) starting material for the polymers. For example, the resin acid or mixture of resin acids can be purified to at least about 95% by weight, such as at least about 98% by weight.

In particular embodiments, the resin acid or mixture of resin acids can be purified to be about 99% by weight to substantially free from other materials. As used herein, the term "substantially free" means no more than an insignificant trace amount present and encompasses completely free (e.g., 0% by weight up to about 0.0001% by weight). Thus, most or substantially all of the other organic material in the rosin can be separated from the resin acid(s) prior to functionalization.

In alternative embodiments, the resin acid(s) can be utilized collectively in their natural rosin form.

II. Functionalized Rosin-Derived Monomers

According to the present method of forming the well-defined polymers, the resin acid(s) can be functionalized with polymerizable groups, such as vinyl groups (e.g., an acrylate group, a methacrylate group, etc.) or strained ring functional groups (e.g., cyclic ester groups like caprolactone or lactide, a norbornene group, a cyclopentene group, etc.). Specifically, the carboxylic acid groups attached from the hydrophenan-threne-based rings can be functionalized into the polymerizable groups.

For example, the carboxylic acid groups on the resin acid(s) can be reacted with an alcohol (R'—OH) to form a carboxylic ester (R—COO—R') by converting resin acid(s) to acid halides followed by simple esterification reaction using triethylamine as the base.

In one particular embodiment, the alcohol can be an hydroxyalkyl acrylate or a hydroxyalkyl methacrylate (collectively referred to as "hydroxyalkyl(meth)acrylate"). Suitable examples of such hydroxyalkyl methacrylates can include hydroxymethyl methacrylate, hydroxyethyl methacrylate, hydroxypropyl methacrylate, hydroxybutyl methacrylate, and so forth.

Upon this reaction, the functionalized resin acid(s) will have vinyl functional group in place of the carboxylic acid function group of the resin acid(s) that is readily polymerizable (e.g., an acrylate or methacrylate functional group).

Figure 2:
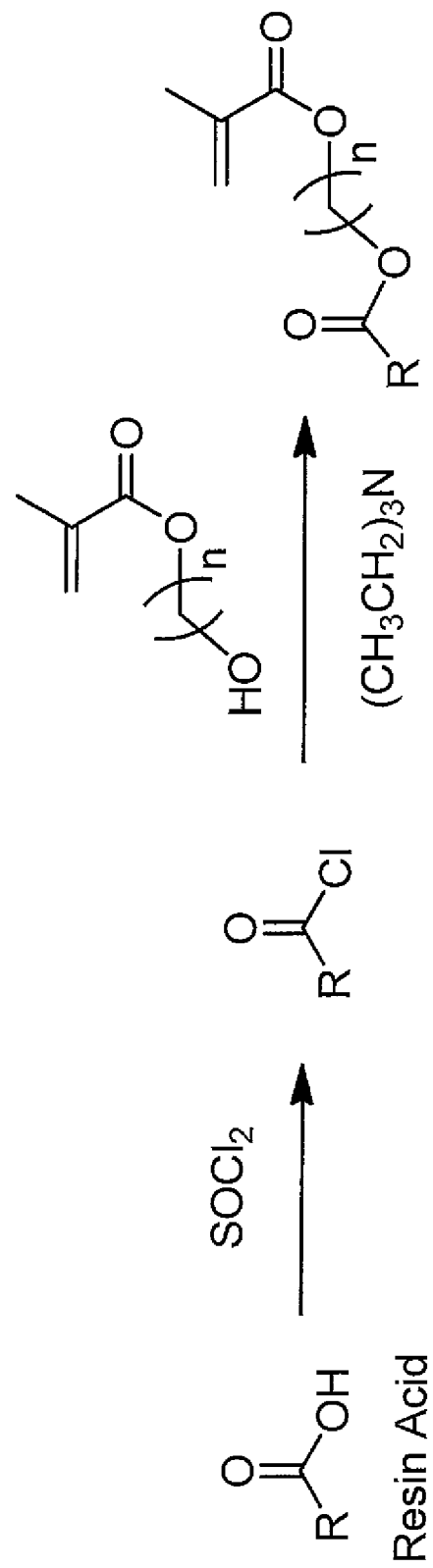
FIG. 2 shows an exemplary reaction of a hydroxyalkyl methacrylate and a resin acid(s) to form a functionalized resin acid(s)

For example, FIG. 2 shows an exemplary reaction of a hydroxyalkyl methacrylate and a resin acid(s) to form a resin acid(s)-derived methacrylate as the functionalized resin acid(s). In FIG. 2, R represents any of the resin acids, and n is an integer representing the number of carbons (i.e., —$CH_2$—) in the chain (e.g., 1 to 10, such as 2 to 5).

III. Polymerization

The functionalized resin acid(s) can be subjected to controlled polymerizations, such as controlled living polymerizations (CLPs) or controlled ring-opening polymerizations. Through the use of these controlled polymerizations, polymers can be produced with low polydispersity, high functionality (e.g., a terminal functional group), and diverse architectures. Thus, these methods are ideal for block polymer and/or graft polymer synthesis.

Controlled living polymerization generally refers to chain growth polymerization which proceeds with significantly suppressed termination or chain transfer steps. Thus, polymerization in CLP proceeds until all monomer units have been consumed, and the addition of monomer results in continued polymerization, making CLP ideal for block polymer and graft polymer synthesis. The molecular weight of the resulting polymer is generally a linear function of conversion so that the polymeric chains are initiated and grow substantially uniformly. Thus, CLPs provide precise control on molecular structures, functionality and compositions. Thus, these polymers can be tuned with desirable compositions and architectures.

Controlled living polymerizations can be used to produce block copolymers because CLP can leave a functional terminal group on the polymer formed (e.g., a halogen functional group). For example, in the copolymerization of two monomers (A and B) allowing A to polymerize via CLP will exhaust the monomer in solution with minimal termination. After monomer A is fully reacted, the addition of monomer B will result in a block copolymer.

Controlled ring-opening polymerizations can utilize suitable catalysts such as tin(II) to open the rings of monomers to form a polymer.

The functionalized resin acid(s) can be polymerized alone (e.g., as a single resin acid or a combination of multiple resin acids) or with other monomers (e.g., styrene, methacrylate, acrylate, lactide, caprolactone, etc., or combinations thereof). As such, in specific embodiments, block copolymers, random copolymers, graft copolymers, star copolymer or organic/inorganic hybrids can each bear other monomer units selected from olefins, conjugated dienes, methacrylates, styrenes, acrylates, acrylamides, and acrylonitriles, esters, ethers, urethanes, ureas, amides and other functional monomer units thereof.

Specific polymerization techniques can be utilized to form the well-defined polymers, as discussed in greater detail below.

A. Atom Transfer Radical Polymerization

Atom transfer radical polymerization (ATRP) is an example of a living radical polymerization. The control is achieved through an activation-deactivation process, in which most of the reaction species are in dormant format, thus significantly reducing chain termination reaction. The four major components of ATRP include the monomer, initiator, ligand, and catalyst. ATRP is particularly useful where the functionalized resin acid(s) have a vinyl functional group (e.g., a (meth)acrylate group).

Organic halides are particularly suitable initiators, such as alkyl halides (e.g., alkyl bromides, alkyl chlorides, etc.). For instance, in one particular embodiment, the alkyl halide can be ethyl 2-bromoisobutyrate. The shape or structure of the initiator can also determine the architecture of the resulting polymer. For example, initiators with multiple alkyl halide groups on a single core can lead to a star-like polymer shape, such as shown in FIG. 1.

The catalyst can determine the equilibrium constant between the active and dormant species during polymerization, leading to control of the polymerization rate and the equilibrium constant. In one particular embodiment, the catalyst is a metal having two accessible oxidation states that are separated by one electron, and a reasonable affinity for halogens. One particularly suitable metal catalyst for ATRP is copper (I).

The ligands can be linear amines or pyridine-based amines.

Depending on the target molecular weight of final polymers, the monomer to initiator ratios can range from less than about 10 to more than about 1,000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. The reaction temperature can range from room temperature (e.g., about 20° C.) to about 120° C. The reaction time can be from less than about 1 h to about 48 h.

B. Reversible Addition-Fragmentation Chain Transfer Polymerization

Reversible Addition-Fragmentation chain Transfer polymerization (RAFT) is another type of controlled radical polymerization. RAFT polymerization uses thiocarbonylthio compounds, such as dithioesters, dithiocarbamates, trithiocarbonates, and xanthates, in order to mediate the polymerization via a reversible chain-transfer process. RAFT polymerization can be performed by simply adding a chosen quantity of appropriate RAFT agents (thiocarbonylthio compounds) to a conventional free radical polymerization. RAFT polymerization is particularly useful where the functionalized resin acid(s) have a vinyl functional group (e.g., a (meth)acrylate group).

Typically, a RAFT polymerization system includes the monomer, an initiator, and a RAFT agent (also referred to as a chain transfer agent). Because of the low concentration of the RAFT agent in the system, the concentration of the initiator is usually lower than in conventional radical polymerization. Suitable radical initiators can be azobisisobutyronitrile (AIBN), 4,4'-azobis(4-cyanovaleric acid) (ACVA), etc.

RAFT agents are generally thiocarbonylthio compounds, such as generally shown below:

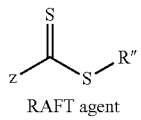

RAFT agent where the z group primarily stabilizes radical species added to the C=S bond and the R group is a good homolytic leaving group which is able to initiate monomers. For example, the z group can be an aryl group (e.g., phenyl group, benzyl group, etc.), an alkyl group, etc. The R" group can be an organic chain terminating with a carboxylic acid group.

As stated, RAFT is a type of living polymerization involving a conventional radical polymerization in the presence of a reversible chain transfer reagent. Like other living radical polymerizations, there is minimized termination step in the RAFT process. The reaction is started by radical initiators (e.g., AIBN). In this initiation step, the initiator reacts with a monomer unit to create a radical species which starts an active polymerizing chain. Then, the active chain reacts with the thiocarbonylthio compound, which kicks out the homolytic leaving group (R"). This is a reversible step, with an intermediate species capable of losing either the leaving group (R") or the active species. The leaving group radical then reacts with another monomer species, starting another active polymer chain. This active chain is then able to go through the addition-fragmentation or equilibration steps. The equilibration keeps the majority of the active propagating species into the dormant thiocarbonyl compound, limiting the possibility of chain termination. Thus, active polymer chains are in an equilibrium between the active and dormant species. While one polymer chain is in the dormant stage (bound to the thiocarbonyl compound), the other is active in polymerization.

By controlling the concentration of initiator and thiocarbonylthio compound, the molecular weight of the polymers can be controlled with low polydispersities.

Depending on the target molecular weight of final polymers, the monomer to RAFT agent ratios can range from about less than about 10 to more than about 1000 (e.g., about 10 to about 1,000). Other reaction parameters can be varied to control the molecular weight of the final polymers, such as solvent selection, reaction temperature, and reaction time. For instance, solvents can include conventional organic solvents such as tetrahydrofuran, toluene, dimethylformamide, anisole, acetonitrile, dichloromethane, etc. The reaction temperature can range from room temperature (e.g., about 20° C.) to about 120° C. The reaction time can be from less than about 1 h to about 48 h.

The RAFT process allows the synthesis of polymers with specific macromolecular architectures such as block, gradient, statistical, comb/brush, star, hyperbranched, and network copolymers.

Because RAFT polymerization is a form of living radical polymerization, it is ideal for synthesis of block copolymers. For example, in the copolymerization of two monomers (A and B) allowing A to polymerize via RAFT will exhaust the monomer in solution with significantly suppressed termination. After monomer A is fully reacted, the addition of monomer B will result in a block copolymer. One requirement for maintaining a narrow polydispersity in this type of copolymer is to have a chain transfer agent with a high transfer constant to the subsequent monomer (monomer B in the example).

Using a multifunctional RAFT agent can result in the formation of a star copolymer. RAFT differs from other forms of CLPs because the core of the copolymer can be introduced by functionalization of either the R group or the Z group. While utilizing the R group results in similar structures found using ATRP or NMP, the use of the Z group makes RAFT unique. When the Z group is used, the reactive polymeric arms are detached from the core while they grow and react back into the core for the chain-transfer reaction.

C. Nitroxide-Mediated Polymerization

Nitroxide-mediated polymerization (NMP) is another form of controlled living polymerization utilizing a nitroxide radical, such as shown below:

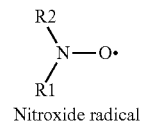

Nitroxide radical where R1 and R2 are, independently, organic groups (e.g., aryl groups such as phenyl groups, benzyl groups, etc.; alkyl groups, etc.). NMP is particularly useful where the functionalized resin acid(s) have a vinyl functional group (e.g., a (meth)acrylate group).

D. Ring-Opening Metathesis Polymerization

Ring-opening metathesis polymerization (ROMP) is a type of olefin metathesis polymerization. The driving force of the reaction is relief of ring strain in cyclic olefins (e.g. norbornene or cyclopentene) in the presence of a catalyst. The catalysts used in a ROMP reaction can include a wide variety of metals and range from a simple $RuCl_3$/alcohol mixture to Grubbs' catalyst.

In this embodiment, the functionalized resin acid can include a strained ring functional group, such as a norbornene functional group, a cyclopentene functional group, etc. to form the rosin derived polymers. For example, norbornene is a bridged cyclic hydrocarbon that has a cyclohexene ring bridged with a methylene group in the para position.

The ROMP catalytic cycle generally requires a strained cyclic structure because the driving force of the reaction is relief of ring strain. After formation of the metal-carbene species, the carbene attacks the double bond in the ring structure forming a highly strained metallacyclobutane intermediate. The ring then opens giving the beginning of the polymer: a linear chain double bonded to the metal with a terminal double bond as well. The new carbene reacts with the double bond on the next monomer, thus propagating the reaction.

E. Ring-Opening Polymerization

In one particular embodiment, where the functionalized resin acid includes a strained ring function group (e.g., a caprolactone or lactide), ring-opening polymerization (ROP) may be used to form the rosin derived polymers. For example, a rosin-substituted caprolactone is a polymerizable ester, which can undergo polymerization with the aid of an alcohol as an initiator and a tin-based reagent as a catalyst.

IV. Rosin-Derived Polymers and Block Co-Polymers

Through CLP, the resulting polymeric material can include well-defined polymers, referencing the substantially low polydispersity index. For example, the resulting polymers can have a PDI of less than 1.5, such as about 1.05 to about 1.45.

The molecular weight of these resulting polymers can be controlled as desired. In most embodiments, the molecular weight of the resulting polymers can be about 2,000 g/mol to about 1,000,000 g/mole, such as about 10,000 g/mol to about 750,000 g/mole. However, in other embodiments, the molecular weight can be larger or smaller.

Generally, the composition of rosin-derived units (i.e., the functionalized resin acid(s) monomers) is primarily in the range of about 10% by weight to about 95% by weight (e.g., about 50% by weight to about 80% by weight). In one particular embodiment, the resulting polymer includes only functionalized resin acid(s) monomers (i.e., about 100% functionalized resin acid(s) monomers).

However, in alternative embodiments, these resulting polymers can bear other comonomers. Particularly suitable comonomers can include those with polymerizable functional groups (e.g., vinyl functionality), such as styrene, methacrylate, acrylate, lactide, caprolactone, etc, and combinations thereof.

In one particular embodiment, the functionalized resin acid(s) monomers can be used for preparation of block copolymers with two monomers (AB diblock copolymer or ABA triblock copolymers) or three monomers (ABC triblock copolymers).

In an alternative embodiment, the functionalized resin acid(s) monomers can be used for preparation of graft copolymers, such as (i) from a polymer backbone; (ii) from a curve surface such as silica nanoparticles; (iii) from a flat surface such as silicon wafer substrates, or the like.

Additionally, the functionalized resin acid(s) monomers can be used for preparation of star copolymers, for organic and/or inorganic nanocomposites, etc.

Rosin-derived block copolymers exhibit microphase separation, which can combine multifunctional properties from the constituent components. The properties can be tuned by changing the molecular weight, compositions and chemical structures of each segment.

In one particular embodiment, degradable polymers can be synthesized from rosin based materials. Such degradable polymers can have many applications including packaging materials, auto parts, drug delivery, tissue engineering, membrane, gas storage, etc. Additionally, the integration of rosin with degradable polymers can have several benefits: 1) more environmentally friendly, through the template of degradable polymers, degradation would produce residual rosin or rosin polymers, which have much lower molecular weight (therefore more compatible with environments) than those rosin polymers without degradation templates; 2) increased renewable capacity for non-renewable degradable polymers by increasing the volume of rosin in the degradable polymers; and 3) new thermal, mechanical and degradability properties originating from rosin moiety.

In particular, the functionalized resin acid(s) can be co-polymerized with degradable comonomers. As such, the resulting copolymers can include the rosin-derived units in about 10% by weight to about 90% by weight, while the degradable comonomers are present in about 10% by weight to about 90% by weight. Suitable degradable comonomers can include caprolactone, lactide, glycolic acid, hydroxyalkanoic acids, hydroxybutyric acid, hydroxyvaleric acid, trimethylene carbonate, etc., or combinations thereof. The comonomer can be used to form random copolymers, block copolymers, graft copolymers, etc.

For example, poly(2-chloro-$\epsilon$-caprolactone) homopolymers can be prepared through ring-opening polymerization, and then converted into poly(2-azide-$\epsilon$-caprolactone) homopolymers, which click with alkyne containing dehydroabietic moiety. Polycaprolactone is degraded under acidic conditions or bio conditions. The caprolactone unit can be replaced by other degradable units, e.g. lactide, glycolic acid, hydroxyalkanoic acids, hydroxybutyric acid, hydroxyvaleric acid, and trimethylene carbonate. The molecular weight of these polymers can be in the range of about 2,000 g/mol to about 1,000,000 g/mole.

Figure 3:
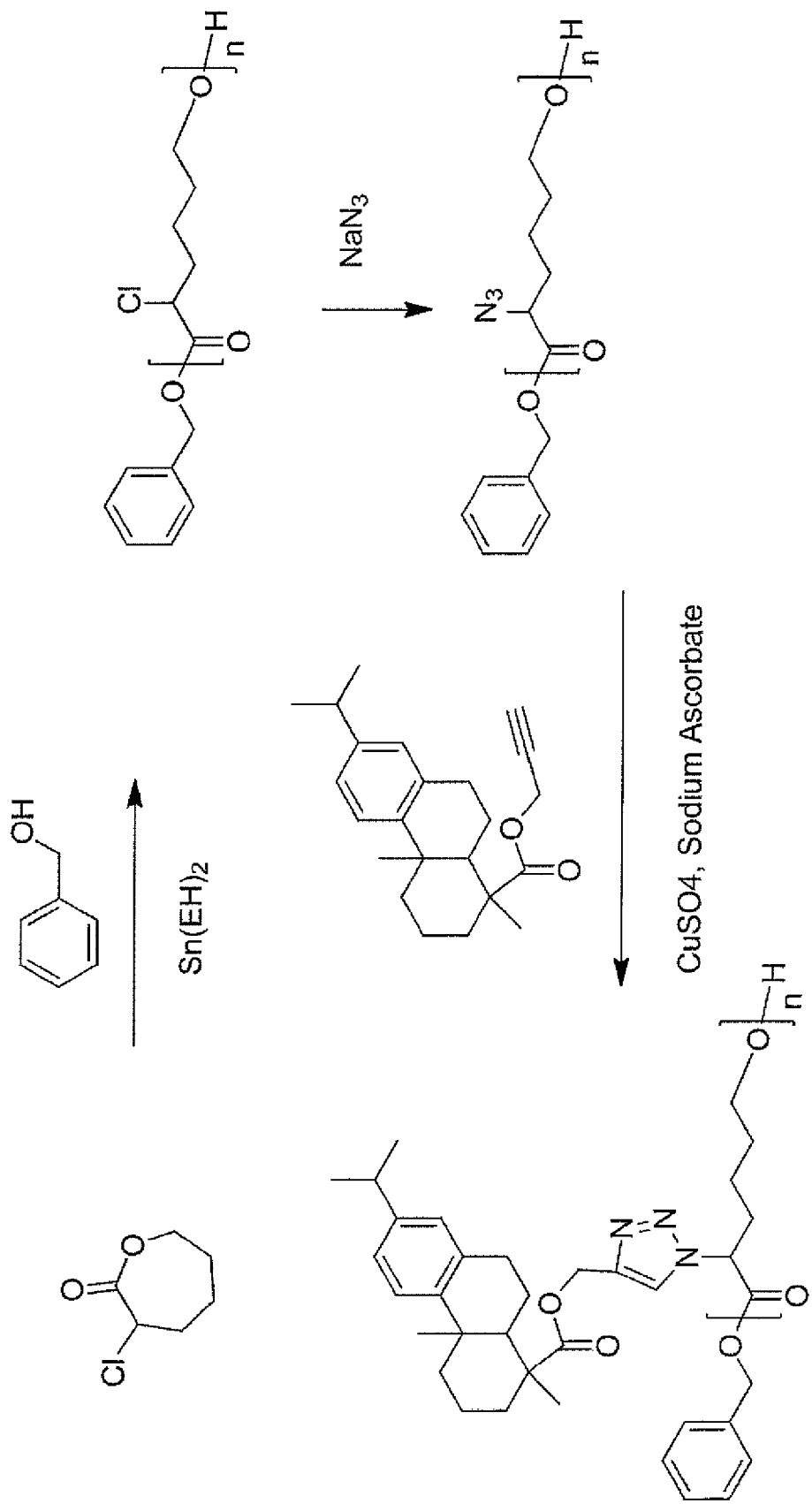
FIG. 3 shows an example of rosin-substituted caprolactone homopolymers prepared by ring-opening polymerization and click reaction.

FIG. 3 illustrates a scheme for one particular embodiment, where homopolymers of caprolactone with a dehydroabietic moiety are used as the side groups in the preparation of the polymer.

Figure 4:
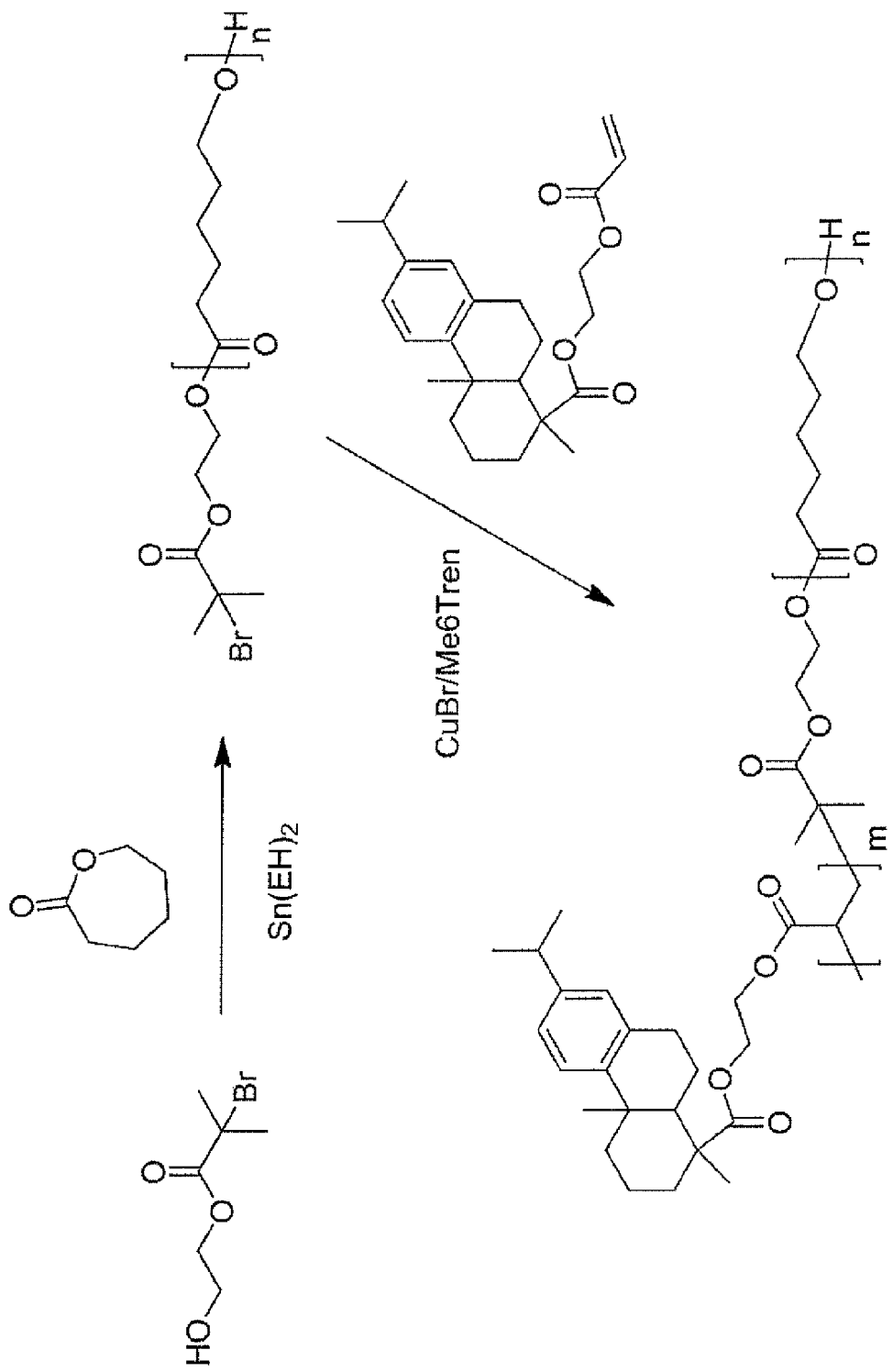
FIG. 4 shows an example of rosin-containing caprolactone diblock copolymers prepared by ring-opening polymerization and atom transfer radical polymerization.

FIG. 4 illustrates a scheme for another particular embodiment, where diblock copolymers of caprolactone and dehydroabietic ethyl acrylate can be prepared. Specifically, polycaprolactone and poly(dehydroabietic ethyl acrylate) block copolymers were prepared through ring-opening polymerization and atom transfer radical polymerization, respectively.

Figure 5:
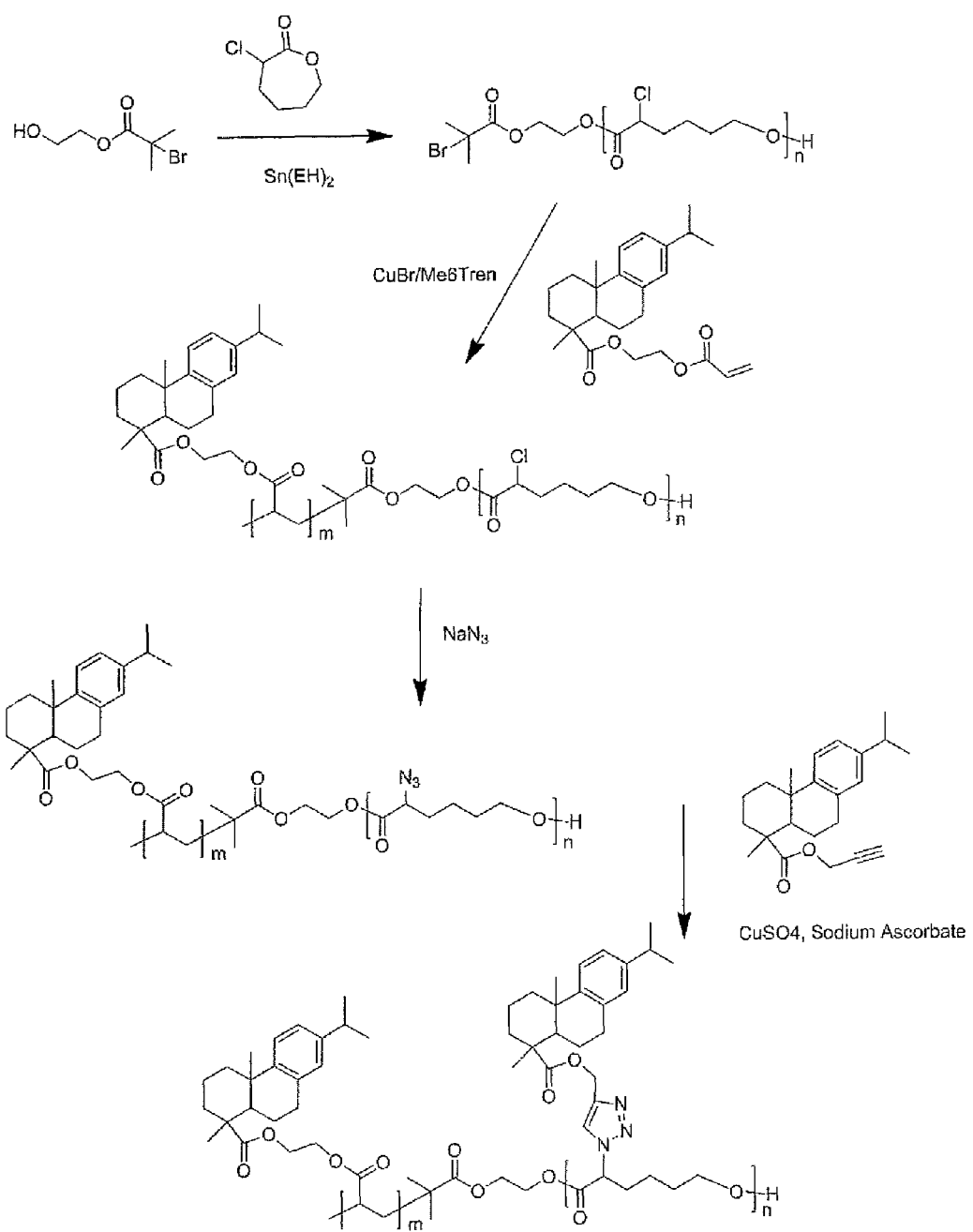
FIG. 5 shows an example of rosin-containing rosin-substituted caprolactone diblock copolymers prepared by ring-opening polymerization, atom transfer radical polymerization and click reaction.

FIG. 5 illustrates a scheme for another particular embodiment, where diblock copolymers of dehydroabietic-substituted caprolactone and dehydroabietic ethyl acrylate can be prepared. As shown, poly(2-chloro-$\epsilon$-caprolactone) and poly(dehydroabietic ethyl acrylate) block copolymers can be prepared through ring-opening polymerization and atom transfer radical polymerization respectively. Poly(2-chloro-$\epsilon$-caprolactone) segments can then be converted into poly(2-azide-$\epsilon$-caprolactone), which click with alkyne containing dehydroabietic moiety.

EXAMPLES

Example 1

Rosin-derived ABA triblock copolymers were prepared for the use as thermoplastic elastomers using atom transfer radical polymerization. Rosin-derived polymers accounted for both inner and outer blocks (i.e., the "A" blocks). The synthesis fully utilized rosin based materials as renewable resources by taking advantage of tunable properties of rosin (e.g. different glass transition temperature $T_g$). Specifically, poly(dehydroabietic acrylate)-block-poly(hydroabietic butyl acrylate)-block-Poly(dehydroabietic acrylate) was prepared. FIG. 1 illustrates this ABA triblock copolymer, which exhibits strong phase separation with component A forming the hard phase (serving as a physical cross-linker) dispersed in the continuous soft rubbery matrix of component B. As shown, component A is a block of dehydroabietic acid functionalized with an acrylate group that has been polymerized and component B is a block of poly(hydroabietic butyl acrylate).

The soft and hard blocks inside and outside respectively, were prepared by sequential polymerization. Difunctional poly(hydroabietic butyl acrylate) macroinitiators were synthesized using dimethyl 2,6-dibromoheptanedioate as initiators, copper (I) bromide/Pentamethyldiethylenetriamine as ligands. The ABA triblock copolymers were prepared by chain extension of difunctional poly(hydroabietic butyl acrylate) macroinitiators with poly(dehydroabietic acrylate) in the presence of copper (I) bromide and pentamethyldiethylenetriamine.

The synthesis of ABA triblock copolymers can be carried out using other controlled polymerizations e.g. group transfer polymerization, nitroxide-mediated polymerization, reversible addition fragmentation transfer polymerization. One of blocks in the ABA triblock copolymers can be other types of polymerizable monomers, such as styrene, methacrylate, acrylate, lactide, caprolactone. All these ABA triblock copolymers exhibit strong phase separation derived from mechanically different domains of rigid and soft segments

Example 2

Rosin based ABA triblock copolymers were prepared with rigid poly(dehydroabietic acrylate) as the outer segment, through the synthesis of difunctional poly(3-hydroxybutyrate) (PHB) by a ring-opening polymerization of butyrolactone in the presence of 1,4-butanediol with distannoxane as the catalyst. PHB was used as the inner block due to its biocompatibility and softness (i.e., $T_g=-2\pm3°$ C.). The hydroxyl-terminated PHB was further reacted with bromoisobutyrate bromide to form an atom transfer radical polymerization macroinitiator, which was then chain extended with dehydroabietic acrylate using copper (I) bromide and tris[2-(dimethylamino)ethyl]amine as catalyst/ligands under 80° C. for 16 hours, yielding ABA triblock copolymers.

Example 3

Rosin-derived acrylic block copolymers were prepared for the use as pigment dispersants using group transfer polymerization. A 25 ml schlenk flask was purged with nitrogen gas. This flask was charged with 0.42 g dimethylketene methyl trimethylsilyl acetal, 0.05 ml xylene and 0.02 mL of a 1M solution of tetrabutylammonium m-chlorobenzoate in acetonitrile. The reaction mixture was then cooled to 7° C. Glycidyl methacrylate (3.4 g) was added in 5 min. The temperature rose to 45° C. After 60 min, dehydroabietic methacylate (10.2 g) was added. The reaction mixture was heated at 65° C. After another 60 min, methanol was added and flask was cooled to room temperature. The synthesis of ABA triblock copolymers can be carried out using other controlled polymerizations e.g. atom transfer radical polymerization, nitroxide-mediated polymerization, reversible addition fragmentation transfer polymerization.

Example 4

Rosin-derived acrylic polymers/silica nanoparticle nanocomposites were prepared. The main principle is to use "grafting from" route to graft rosin-derived polymers from nanoparticle surface. Silica nanoparticles (size about 20 nm) were functionalized with atom transfer radical polymerization initiator by reacting 1-(chlorodimethylsilyl)propyl 2-bromoisobutyrate with the hydroxyl groups on the silica particle surface. These functionalized silica nanoparticles, CuBr, and di-4,4'-(5-nonyl)-2,2'-bipyridine were mixed in a 50 mL Schlenk flask. The mixture was treated three time freeze-pump-thaw cycles, and then abietic acrylate (already purged with nitrogen) was added to the flask. The reaction mixture was placed in an 80° C. oil bath for 24 hours. These nanoparticles can be extended to other types of materials such as gold nanoparticles and quantum dots.

Example 5

Rosin-containing caprolactone-based homopolymers (as shown in FIG. 3) were prepared. The synthesis integrated rosin components into degradable monomers as substituted groups. A typical procedure for the synthesis is described as follows: 2-chloro-ε-caprolactone and benzyl alcohol, and toluene were placed in a Schlenk flask, a solution of tin(II) 2-ethylhexanoate (Sn(EH)$_2$) was added and the flask was purged with N$_2$. The mixture was stirred at 120° C. for 12 h to yield poly(2-chloro-ε-caprolactone) homopolymers. The poly(2-chloro-ε-caprolactone) was stirred with sodium azide in dimethylformamide for 24 h, yielding poly(2-azide-ε-caprolactone). Click reaction between poly(2-azide-ε-caprolactone) and dehydroabietic alkyne resulted in polycaprolactone with dehydroabietic as substituted group.

Example 6

Polycaprolactone-b-poly(dehydroabietic ethyl acrylate) diblock copolymers were prepared, as shown in FIG. 4, involving the synthesis of polycaprolactone by a ring-opening polymerization and poly(dehydroabietic ethyl acrylate) by atom transfer radical polymerization. An initiator containing both functional groups for ROP and ATRP was used. A typical procedure for the synthesis is described as follows: caprolactone and 2-hydroxylethyl bromoisobutyrate, and toluene were placed in a Schlenk flask, a solution of Sn(EH)$_2$ was added and the flask was purged with N$_2$. The mixture was stirred at 120° C. for 12 h to yield polycaprolactone homopolymers. The polycaprolactone was mixed with dehydroabietic ethyl acrylate, tris[2-(dimethylamino)ethyl]amine in tetrahydrofuran and purged with N$_2$. Copper (I) bromide was then added to the mixture under nitrogen purge. The mixture was then stirred at 90° C. for 16 h, yielding the desired block copolymers.

Example 7

Polycaprolactone-b-poly(dehydroabietic ethyl acrylate) diblock copolymers with caprolactone substituted with dehydroabietic group were prepared, as shown in FIG. 5. The synthesis combines examples 5 and 6. First, diblock copolymers poly(2-chloro-ε-caprolactone-b-poly(dehydroabietic ethyl acrylate) were prepared using the procedure described in example 6. The substituted chloro group was then converted into dehydroabietic group, using the procedure described in example 5.

Example 8

Rosin-containing lactide-based homopolymers were prepared using a procedure similar to example 5. Propargyl glycolide, Sn(EH)$_2$ and 4-Pert-butylbenzyl alcohol solutions were mixed in a Schlenk flask and purged with N$_2$. After removing solvent under reduced pressure, the mixture was stirred at 130° C. for 12 h, yielding alkyne-substituted polylactide. Click reaction between alkyne-substituted polylactide and dehydroabietic azide resulted in dehydroabietic-substituted polylactide.

Example 9

Polylactide-b-poly(dehydroabietic ethyl acrylate) diblock copolymers were prepared using a procedure similar to example 6, involving the synthesis of polylactide by a ring-opening polymerization and poly(dehydroabietic ethyl acrylate) by atom transfer radical polymerization. An initiator containing both functional groups for ROP and ATRP was used. A typical procedure for the synthesis is described as follows: lactide and 2-hydroxyethyl bromoisobutyrate, and toluene were placed in a Schlenk flask, a solution of Sn(EH)$_2$ was added and the flask was purged with N$_2$. The mixture was stirred at 130° C. for 12 h to yield polylactide homopolymers. The polylactide was mixed with dehydroabietic ethyl acrylate, tris[2-(dimethylamino)ethyl]amine (Me6Tren) in tetrahydrofuran and purged with N$_2$. Copper (I) bromide was then added to the mixture under nitrogen purge. The mixture was then stirred at 90° C. for 16 h, yielding the desired block copolymers.

Example 10

Polylactide-b-poly(dehydroabietic ethyl acrylate) diblock copolymers with lactide substituted with dehydroabietic group were prepared. The synthesis combines examples 8 and 9. First, diblock copolymers poly(propargyl glycolide)-b-poly(dehydroabietic ethyl acrylate) were prepared using the procedure described in example 9. The substituted group was then converted into dehydroabietic group, using the procedure described in example 8.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:
1. A method of forming polymer material from rosin-derived material, the method comprising:
polymerizing a plurality of functionalized resin acids having a polymerizable functional group via controlled polymerization into the polymeric material, wherein each polymer defines a functional end group, and wherein the polymeric material has a polydispersity index of about 1 to about 1.5.

2. The method of claim 1, wherein the polymer has a polydispersity index of about 1.05 to about 1.45.

3. The method of claim 1, wherein the polymer has a polydispersity index of about 1.5.

4. The method of claim 1, wherein the polymerizable functional group comprises a vinyl group.

5. The method of claim 4, wherein the functional end group comprises a vinyl group.

6. The method of claim 4, further comprising:
reacting a carboxylic acid group on a resin acid with an amine to form the functionalized resin acid having a vinyl functional group.

7. The method of claim 4, further comprising:
reacting a carboxylic acid group on a resin acid with an alcohol to form the functionalized resin acid having a vinyl functional group.

8. The method of claim 7, wherein the alcohol comprises a hydroxyalkyl (meth)acrylate.

9. The method of claim 7, wherein the alcohol comprises a hydroxyalkyl methacrylate.

10. The method of claim 4, wherein the plurality of functionalized resin acids are polymerized via controlled living polymerization.

11. The method of claim 10, wherein the controlled living polymerization comprises atom transfer radical polymerization, wherein the functionalized resin acid is polymerized in a polymerization solution comprising the functionalized resin acid, an initiator, a ligand, and a catalyst.

12. The method of claim 11, wherein the initiator comprises an organic halide.

13. The method of claim 12, wherein the organic halide comprises an alkyl halide.

14. The method of claim 11, wherein the catalyst comprises copper(I).

15. The method of claim 10, wherein the controlled living polymerization comprises reversible addition-fragmentation chain transfer polymerization, wherein the functionalized resin acid is polymerized in a polymerization solution comprising the functionalized resin acid, an initiator, and a chain transfer agent.

16. The method of claim 15, wherein the initiator comprises azobisisobutyronitrile, 4,4'-azobis(4-cyanovaleric acid), or combinations thereof.

17. The method of claim 15, wherein the chain transfer agent comprises a thiocarbonylthio compound.

18. The method of claim 17, wherein the chain transfer agent comprises

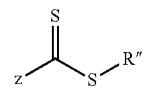

where z represents an aryl group or an alkyl group and R" represents an organic chain terminating with a carboxylic acid group.

19. The method of claim 10, wherein the controlled living polymerization comprises nitroxide-mediated polymerization, wherein the functionalized resin acid is polymerized in a polymerization solution comprising the functionalized resin acid and a nitroxide radical.

20. The method of claim 19, wherein the nitroxide radical comprises

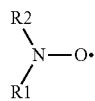

where R1 and R2 are, independently, organic groups.

21. The method of claim 1, wherein the polymerizable functional group comprises a strained ring functional group.

22. The method of claim 21, wherein the plurality of functionalized resin acids are polymerized via controlled ring-opening polymerization.

23. The method of claim 22, wherein the controlled ring-opening polymerization comprises ring-opening metathesis polymerization, and wherein the strained ring functional group comprises a cyclic olefin functional group.

24. The method of claim 23, wherein the cyclic olefin functional group comprises a norbornene functional group or a cyclopentene functional group.

25. The method of claim 23, wherein the cyclic olefin functional group comprises a cyclic ester group.

26. The method of claim 25, wherein the cyclic ester group comprises caprolactone or lactide.

27. The method of claim 1, wherein the functionalized resin acid comprises a resin acid, wherein the resin acid is abietic acid, neoabietic acid, dehydroabietic acid, palustric acid, levopimaric acid, pimaric acid, isopimaric acids, or combinations thereof.

28. The method of claim 1, wherein the polymer has a molecular weight of about 2,000 g/mol to about 1,000,000 g/mole.

29. The method of claim 1, wherein the polymer has a molecular weight of about 10,000 g/mol to about 750,000 g/mole.

30. The method of claim 1, wherein the functionalized resin acid is copolymerized with a comonomer.

31. The method of claim 30, wherein the comonomer is a degradable comonomer.

32. The method of claim 31, wherein the degradable comonomer comprises caprolactone, lactide, glycolic acid, hydroxyalkanoic acids, hydroxybutyric acid, hydroxyvaleric acid, trimethylene carbonate, or combinations thereof.

33. The method of claim 1, further comprising:
allowing polymerization to exhaust substantially all available functionalized resin acids to form a first block;
polymerizing a plurality of comonomers to form a second block attached to the first block.

34. The method of claim 33, further comprising:
allowing polymerization to exhaust substantially all available comonomers to form the second block; and
polymerizing a plurality of functionalized resin acids to form a third block attached to the second block.

* * * * *